(12) United States Patent
Rogmans

(10) Patent No.: US 11,118,986 B2
(45) Date of Patent: Sep. 14, 2021

(54) METHOD, DEVICE, AND PRODUCT FOR MEASUREMENT OF SHEAR FORCE ASSOCIATED WITH A SEATING SURFACE

(71) Applicant: Vicair B.V., Wormer (NL)

(72) Inventor: Max Paul Rogmans, Wormer (NL)

(73) Assignee: Vicair B.V., Wormer (NL)

( * ) Notice: Subject to any disclaimer, the term of this patent is extended or adjusted under 35 U.S.C. 154(b) by 231 days.

(21) Appl. No.: 16/306,230

(22) PCT Filed: May 31, 2017

(86) PCT No.: PCT/NL2017/050352
§ 371 (c)(1),
(2) Date: Nov. 30, 2018

(87) PCT Pub. No.: WO2017/222366
PCT Pub. Date: Dec. 28, 2017

(65) Prior Publication Data
US 2019/0178731 A1    Jun. 13, 2019

(30) Foreign Application Priority Data

May 31, 2016 (NL) ..................................... 2016871

(51) Int. Cl.
*G01L 1/16* (2006.01)
*G01G 21/28* (2006.01)
(Continued)

(52) U.S. Cl.
CPC ................ *G01L 1/16* (2013.01); *G01G 21/28* (2013.01); *A47C 31/00* (2013.01); *A61G 5/10* (2013.01); *B60N 2/80* (2018.02); *B64D 11/06* (2013.01)

(58) Field of Classification Search
CPC . G01G 21/28; B60N 2/80; A61G 5/10; A61G 5/006; A61G 5/121; A61G 5/128; A61G 5/1059; A61G 2200/36; A61G 2203/14; A61G 5/045; A61G 5/14; A61G 5/125; A61G 2200/14; A61G 2203/12; A61G 5/1067; A61G 5/1075; A61G 2203/74; A61G 5/12; A61G 5/107;
(Continued)

(56) References Cited

U.S. PATENT DOCUMENTS

| 5,297,021 A | * | 3/1994 | Koerlin | ................ A61G 5/1067 180/907 |
| 2003/0090089 A1 | * | 5/2003 | Koerlin | .................. A61G 5/006 280/650 |
| 2003/0098190 A1 | * | 5/2003 | Kanno | .................... A61G 5/048 180/65.6 |

FOREIGN PATENT DOCUMENTS

JP        200150889 A    2/2001

* cited by examiner

*Primary Examiner* — Brandi N Hopkins
(74) *Attorney, Agent, or Firm* — The Webb Law Firm

(57) ABSTRACT

The present invention relates to a shear force measuring device for measuring a shear force of a human body relative to a seat, such as a chair, wheelchair, aircraft seat, the device including: a frame for providing a mechanical, substantially slide-free connection to the seat, a force sensor arranged on the frame, shear force receiving means for receiving the shear force which are coupled to the sensor. The shear force receiving means are arranged and configured such that shear force exerted on the shear force receiving means is transferable to the sensor so that the shear force is detectable by the sensor. The present invention further relates to a wheelchair or seat, a method and a computer-readable carrier including computer program means.

26 Claims, 7 Drawing Sheets

(51) Int. Cl.
*B60N 2/80* (2018.01)
*A47C 31/00* (2006.01)
*A61G 5/10* (2006.01)
*B64D 11/06* (2006.01)

(58) Field of Classification Search
CPC ....... A61G 2203/42; G01L 1/16; A47C 31/00; B64D 11/06; Y10S 297/04; Y10S 180/907
See application file for complete search history.

METHOD, DEVICE, AND PRODUCT FOR MEASUREMENT OF SHEAR FORCE ASSOCIATED WITH A SEATING SURFACE

CROSS-REFERENCE TO RELATED APPLICATIONS

This application is the United States national phase of International Application No. PCT/NL2017/050352 filed May 31, 2017, and claims priority to Dutch Patent Application No. 2016871 filed May 31, 2016, the disclosures of which are hereby incorporated in their entirety by reference.

BACKGROUND OF THE INVENTION

Field of the Invention

The present invention relates to a shear force measuring device for measuring a shear force of a human body relative to a seat, such as a chair, wheelchair, aircraft seat, car seat. The present invention also relates to a chair or wheelchair comprising such a determining device. The present invention further relates to a method for performing a shear force measurement making use of a shear force measuring device according to the present invention. The present invention also relates to a computer-readable carrier comprising computer program means for performing a method according to the present invention.

Description of Related Art

A frequent problem for people who are involuntarily bedridden or confined to a wheelchair for a longer period of time is that the body of these individuals has to endure shear forces. Because such individuals are subjected to shear forces, there results physical damage such as general discomfort, decubitus, undesirable pelvic tilt, contusions or friction injuries.

A vertical load on a body which occurs when a person rests without horizontal load component on a seating surface or lying surface is many times less onerous to the body than a load resulting from a combination of a vertical load and a horizontal load. When a body is for instance seated for a long period of time in a chair, the person will relax and a horizontal shear force will occur because the body pushes against the backrest. The horizontal shear force occurs under the seating surface or at least between the body and the seating surface of the chair. The horizontal shear force also exacerbates damage which occurs due to vertical pressure, particularly when both forces occur.

The greater the imbalance of the person, the greater the shear forces will be. This is particularly stressful when the person is affected by a combination of having to spend much time sitting and a poor physical condition.

SUMMARY OF THE INVENTION

It is an object of the present invention to contribute toward reducing these symptoms. The present invention provides for this purpose a shear force measuring device for measuring a shear force of a human body relative to a seat, such as a chair, wheelchair, aircraft seat, car seat, the device comprising:
- a frame for providing a mechanical, substantially slide-free connection to the seat,
- a force sensor arranged on the frame,
- shear force receiving means for receiving the shear force which are coupled to the sensor, wherein the shear force receiving means are arranged and configured such that shear force exerted on the shear force receiving means is transferable to the sensor so that the shear force is detectable by the sensor.

An advantage of the present invention is that a force measurement can be performed in any seat used by an end user. An important objective here is for the device to function in combination with diverse seats with diverse seating surfaces. A further object here is for the device to function when a curvature is caused because the seating surface is deformed when the weight of the person presses downward after he/she sits down. Various embodiments as described below achieve this object, whereby they can be utilized in flexible manner on many seating surfaces, each deforming in their own way.

A further advantage of such a shear force measuring device is that the presence of the shear force and an order of magnitude thereof can be determined. In order to be able to modify the sitting posture it is important that the necessity to do so is recognized. Many people who experience symptoms are unable to recognize the shear forces in timely manner. While other people experiencing symptoms are able to recognize the shear forces in timely manner, they are unable to communicate this to those around them. The present invention therefore contributes toward resolving the problem of the symptoms in that the shear force can be identified on the basis of a measurement and subsequently prevented by for instance placing the body in a more stable position, at least in a position which results in fewer horizontal shear forces. It is also possible to recognize the fact that the person can follow training so as to learn independently how to avoid sitting down such that shear forces occur.

An important advantage of the present invention is that the shear forces can be identified and the seat can be adjusted in order to reduce the problems of shear forces by reducing the shear forces. The angle of the seating surface can for instance be adjusted for this purpose. The angle of the backrest can alternatively be adjusted.

Particularly when a wheelchair is taken into use the invention is advantageous in setting the chair for optimal use. Such optimal use envisages for instance that the user is positioned such that the shear forces are minimal during use. The invention is preferably applied here to measure the development of the shear forces for a period of time, such as a day or part thereof, but equally well for several days. The reasoning behind this is that changes usually occur in the forces during the day, such as under the influence of the adjustment of the chair.

When the user sits down and is still fit, the user usually prevents the shear forces, although shear forces subsequently occur during the day, for instance because less attention is focused on sitting or because the user becomes tired. By making use of measurement data recorded during this period it is not only possible to optimize the setting before the start of the seated period but also to optimize prevention of shear forces which occur later. Hereby realized is that this improved setting of shear forces is also optimized for a period of use of weeks, months and longer. Being able to record shear forces for the whole measurement period is therefore important and advantageous for this application. Preferred ranges of the time duration in which recording is tracked are several hours, such as between 4 and 12 hours, preferably 8 hours, one to several days, one to several weeks, or more preferably continuously as long as a person is seated on the seat.

In a first preferred embodiment the shear force measuring device comprises a slide assembly enhancing substantially frictionless or low-friction slidability of the shear force receiving means relative to the sensor and/or the seat, wherein the slide assembly preferably comprises coupling means, such as hook and loop tape, for coupling to the frame. The use of such a slide assembly significantly improves the quality of the measurement because friction is reduced or prevented. Friction eliminates the shear force, whereby the measurement of the shear force would be correspondingly lower. A very simple variant of a slide assembly is a single or multiple sheet of a smooth material such as a smooth plastic.

According to a further preferred embodiment, the slide assembly is configured to impart slidability to the shear force receiving means over an operating distance of the force sensor. The slide assembly hereby operates over the required range.

According to a further preferred embodiment, an operating distance of the force sensor is such that substantially no movement of the shear force receiving means is required. This is particularly advantageous when the operating distance of the force sensor is very small or zero. This is possible in the case of a sensor with a solid state where pressure on the material or the composition of the material provides the measurement, for instance by generating a voltage or current. The piezoelectric effect is provided here as effect which can be usefully applied. The operating distance of the force sensor lies for instance in the range of 1μ to 1 cm.

The slide assembly more preferably comprises at least two layers of sheeting with lubricants and/or a quantity of air arranged therebetween. A very low friction force is hereby realized between the sheetings in practical manner, whereby the detection of the shear force is substantially equal to the actual shear force. The lubricants more preferably comprise an oil, such as a silicone oil, a grease such as a lubricating grease, a graphite-containing emulsion, or a gel.

According to a further preferred embodiment, the sheeting or at least a layer thereof in the shear force measuring device is treated, such as impregnated and/or coated, with a friction-reducing additive, such as by means of silicones, (poly)urethane. Friction between layers of sheeting is hereby reduced or wear of the sheeting is reduced. The permeability of the sheeting by lubricants is also reduced by means of such treatment, this further increasing durability.

Particularly preferred materials for the sheeting comprise nylon, polyester, polypropylene, polyethylene.

The slide assembly more preferably comprises a layer formed from a deformable material, wherein the deformable material is an elastic material or a gelatinous material. Using such a material the shear force receiving means can transfer the shear force to the sensor within extensibility of the material. The choice of material is envisaged here such that the force required to deform the material is minimal, whereby as much as possible of the shear force is transferred to the sensor.

According to a further preferred embodiment, a base element of the frame extends over a width of between a third of and the whole of the width of the seating surface forming a seat. Recording of stable measurements is hereby realized. It is hereby also possible to apply two shear force receiving means functioning in parallel. Although a single shear force receiving means will function in itself, a dual embodiment is advantageous for determining differences between shear forces on the left and right-hand sides.

The frame more preferably comprises at least one, preferably two or three, auxiliary elements extending, such as extending forward, from the base element. Such auxiliary elements, or arms, of the frame impart positional stability to the device during use. Such auxiliary elements are also of practical use in stabilization relative to a sleeve to be described below.

Such a sleeve is more preferably provided for the purpose of enveloping at least a part of the shear force receiving means during use and/or providing a stable arrangement relative to a seating surface of the seat, preferably comprising for this purpose a slip-resistant underside, such as comprising a rubber. Such a sleeve is advantageous during placing of the device on the seat, or the seating surface thereof. The sleeve preferably provides a slip-resistance for fixed positioning relative to the seating surface. The sleeve also provides protection for the different arms of the frame and shear force receiving means.

The sleeve is also more preferably provided with lateral upright side parts providing for gliding of a seat cushion. A deviation in the detection of the shear force due to friction along the side of the cushion is hereby prevented. Provision is preferably also made that the sleeve is provided with connecting means, such as comprising hook and loop tape, for coupling to the upper side of the shear force receiving means for the purpose of transferring the shear force thereto. This prevents an erroneous measurement due to longitudinal gliding along the upper side.

More preferably provided for the purpose of providing a uniform seating surface are filler means for filling space between the shear force receiving means.

According to a further preferred embodiment, the shear force receiving means include elements that are substantially lamellar. A practical filling of the seating surface is hereby provided, and a large receiving area is realized for receiving the shear force. This also contributes toward correct operation during deformation of a seating surface of a seat.

The frame more preferably comprises at least one transverse elongate element which is arrangeable on the rear side of the seating surface of the seat and from where at least one, preferably two or three, of the shear force receiving means is arranged extending in a forward direction, more preferably wherein at least one, preferably two or three, auxiliary elements of the frame are arranged parallel to the shear force receiving means. Hereby realized in advantageous manner is that the seating surface is in large part filled with auxiliary elements and shear force receiving means, whereby a balanced seating surface is realized. Unevenness of a seating surface of the seat is hereby minimized while retaining all the stated advantages of the shear force measuring device.

According to a further preferred embodiment, the shear force measuring device comprises a control module coupled to the sensor for receiving measurements from the sensor, wherein the control module comprises a memory for storing a series of measurements therein for the purpose of analysing these measurements. A significant advantage of such a preferred embodiment is that the development of the shear force can be analysed during use. Shear forces can for instance be lower in the morning than in the afternoon, whereby a different adjustment of the seating surface or the backrest or the seat is generally required. It is precisely such developments which are usually noticed too late by the respective person or, without the present invention, the person has no possibility of taking them into account. An example is observing pelvic tilt, this disorder usually being inadequately identified.

It also becomes possible to carry out adjustment of the seat automatically on the basis of the measurement of the shear force.

The shear force measuring device more preferably comprises for this purpose a transceiver, such as comprising a Bluetooth or WiFi module, for outputting the measurements to a computer device. The computer device can be used for analysis and adjustments. Provision is also made that the data are forwarded directly to a therapist or doctor.

A further aspect according to the present invention relates to a wheelchair or seat comprising a shear force measuring device according to the present invention, this providing advantages as described in the foregoing.

A further aspect according to the present invention relates to a method for performing a shear force measurement making use of a shear force measuring device according to one or more of the foregoing claims, the method comprising steps for:

recording a series of measurements by means of the sensor at a predetermined time interval, storing the series of measurements in a memory, outputting the measurements to a computer device in the case of an active communication connection to the computer device, this providing advantages as described in the foregoing. Further aspects according to the present invention relate to a computer-readable carrier comprising computer program means for performing a method according to the invention when the computer program means are loaded into a control module of a shear force measuring device according to the present invention; and a computer-readable carrier comprising computer program means for receiving, when executed on a processing unit of a computer device, measurements from a shear force measuring device according to the present invention with the computer device, this providing advantages as described in the foregoing.

DESCRIPTION OF THE INVENTION

Figure 1:
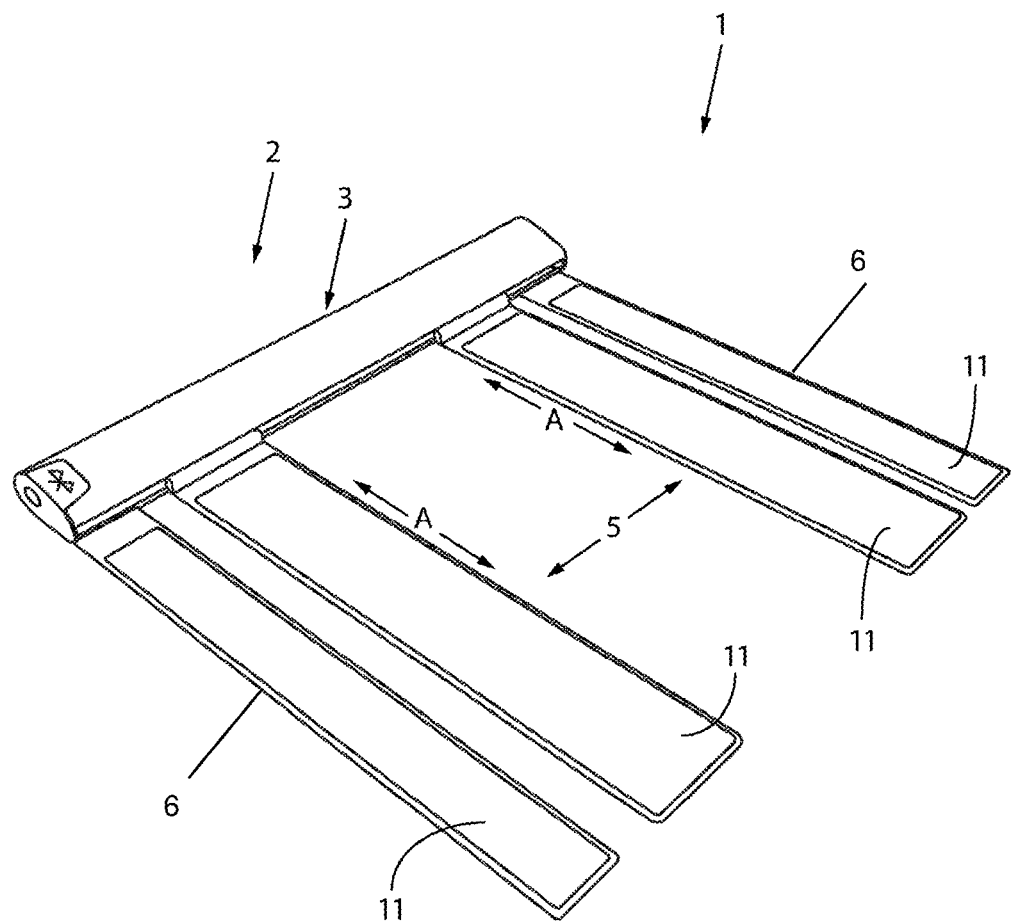
FIG. 1 is a schematic perspective view of a first preferred embodiment.
Figure 2:
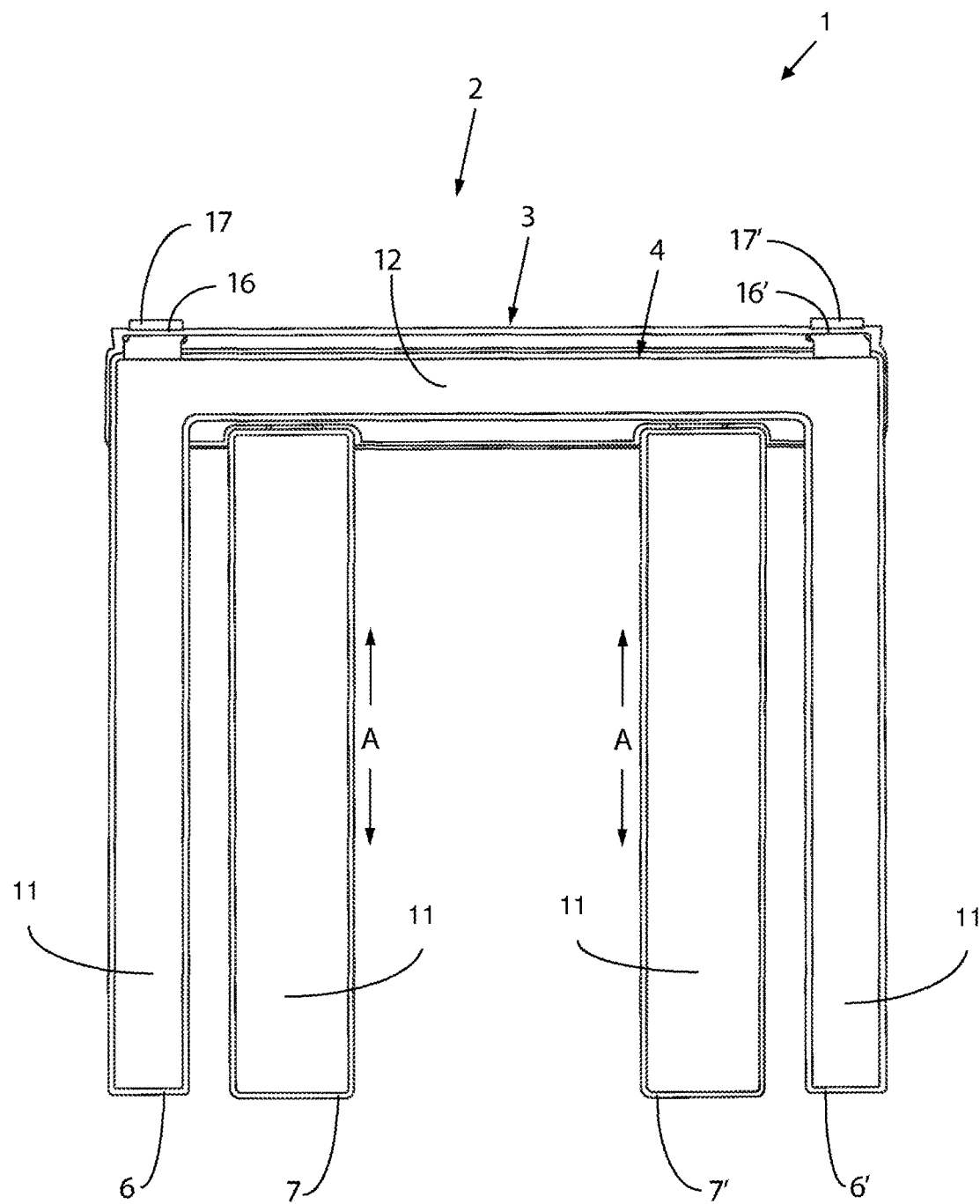
FIG. 2 is a schematic bottom view of this preferred embodiment.
Figure 3:
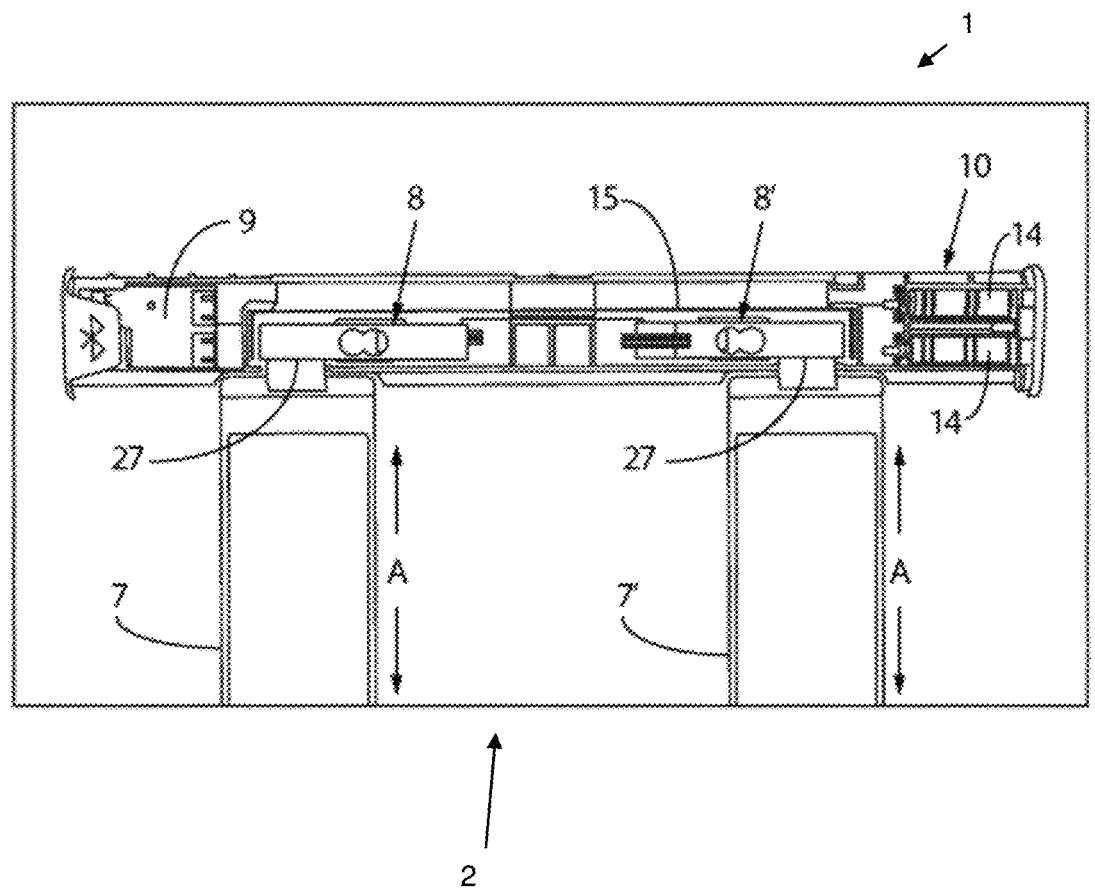
FIG. 3 is a cut-away top view of a detail of the preferred embodiment.
Figure 4:
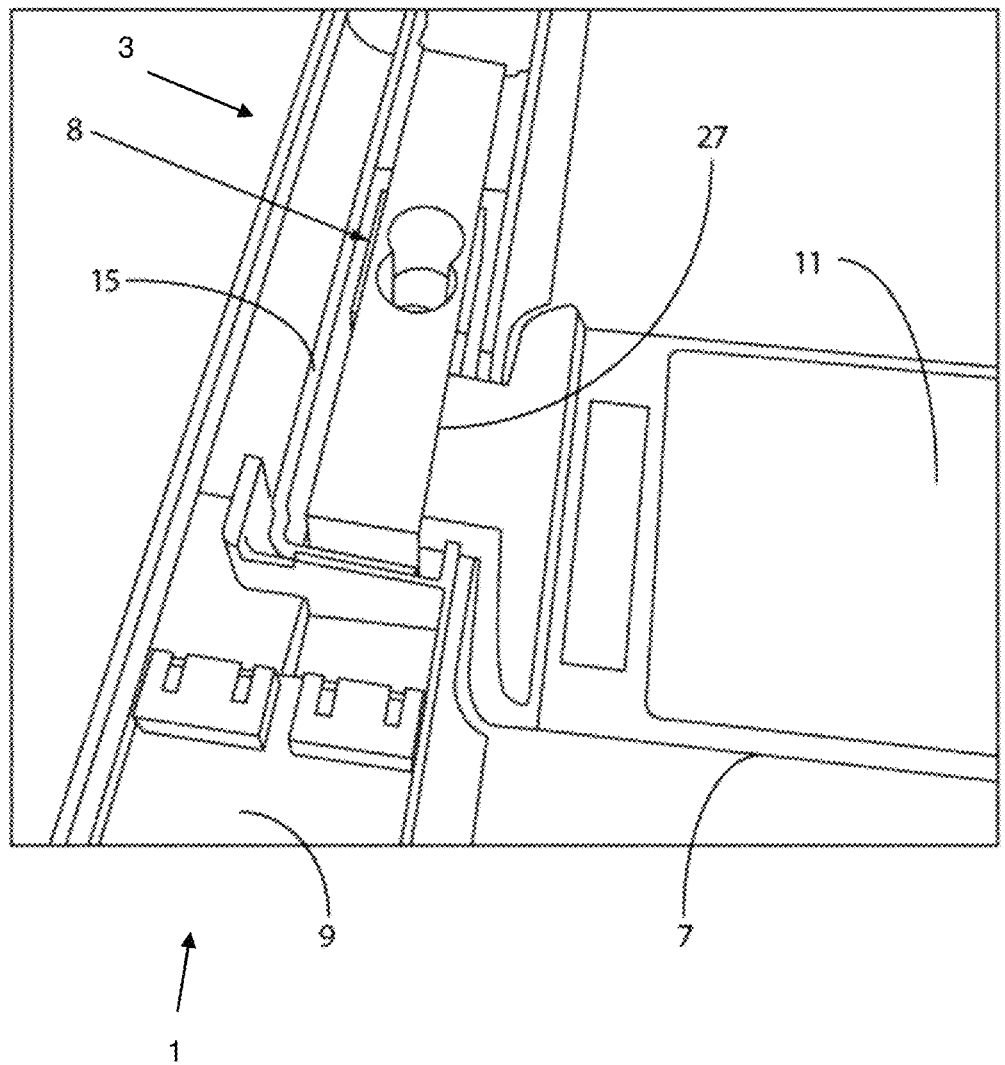
FIG. 4 shows a further detail of FIG. 3.
Figure 5:
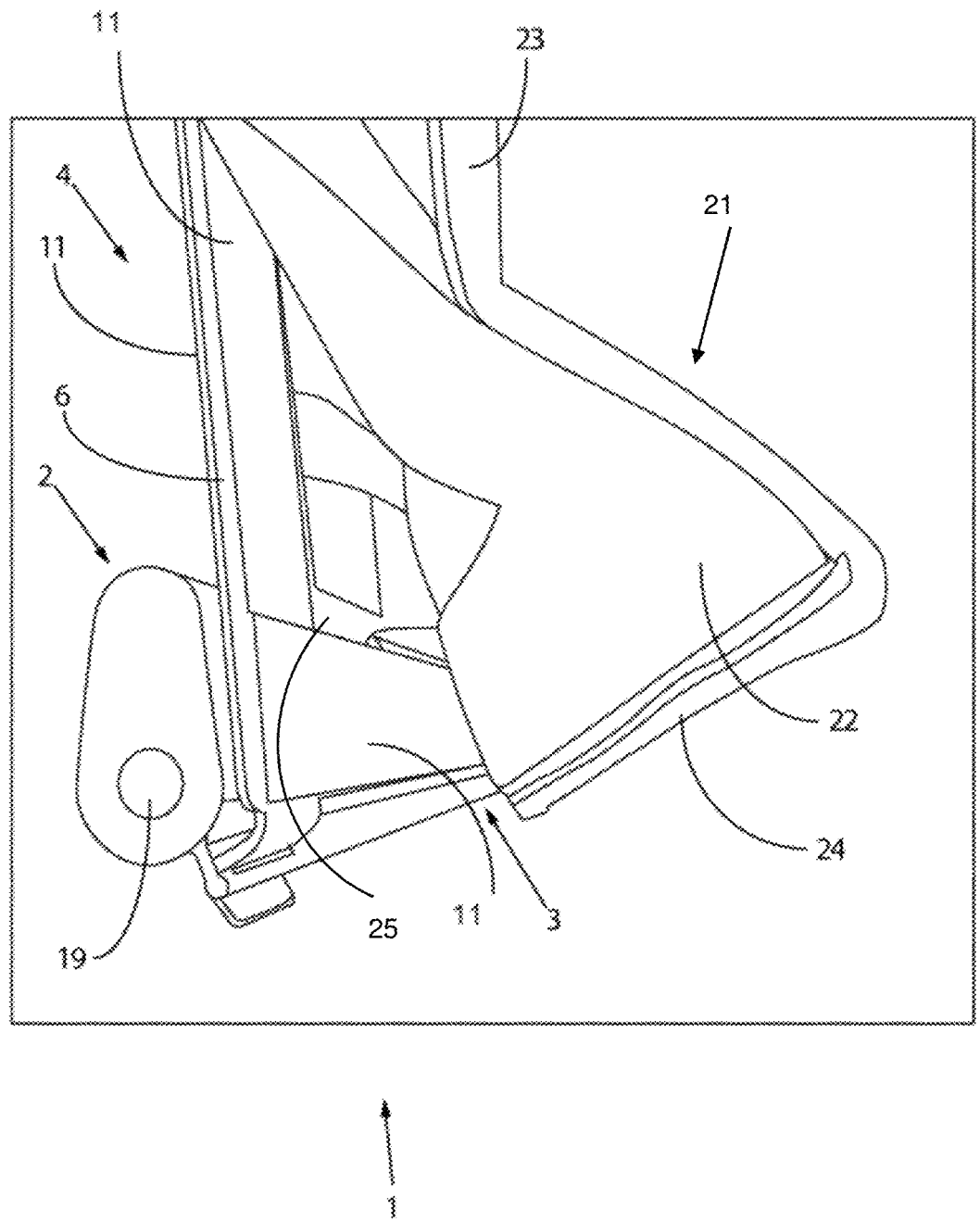
FIG. 5, 6, 7 are schematic perspective views of the preferred embodiment used with a sleeve.

A preferred embodiment (FIG. 1-FIG. 7) relates to a shear force measuring device 1 comprising a frame 2 and shear force receiving means 5 extending perpendicularly from a base element 3 of the frame 2. The base element 3 is a transverse elongate element provided for placing along the rear side of the seating surface of the seat. Present in the frame 2 are two sensors 8, 8' to which the respective shear force receiving means 7, 7' are coupled. Shear force receiving means 7, 7' are movable in the direction of arrows A.

Arranged in addition to sensors 8, 8' in base element 3 of the frame 2 is an energy source 10 in the form of two batteries 14. This energy source 10 powers control unit 9 and, by means of this latter, the sensors 8, 8'. Control unit 9 comprises a processing unit and memory for processing and storing measurements performed by sensors 8, 8'. These sensors 8, 8' are each load cells which are mounted on the sides facing toward each other on support bracket 15 which has a low U-shape. On the force measuring side 27 of each one of the sensors 8, 8', the sensor is coupled to shear force receiving means 7, 7'. Measurement signals from the sensors 8, 8' are transferred by means of connecting wires 29 to control unit 9.

The control unit further comprises a data connection by means of a wireless transceiver, such as Bluetooth or WiFi. The data relating to the measurements can hereby be transmitted to a computer device (not shown). The measurements can be analysed and displayed by means of this computer device. The control unit is alternatively provided with a loudspeaker for providing a relevant audible warning, such as beeps or spoken messages. These are per se known ways of feeding back information. The control unit is operated by means of a control button 19 on the outer end surface of base element 3.

In addition to the base element 3, the frame 2 also has two auxiliary elements 6, 6' extending perpendicularly thereof. Auxiliary elements 6, 6' are mutually connected by means of a connecting element 12, together with which they form a substantially U-shaped element 4. This U-shaped element 4 is connected by means of a hook construction to base element 3. A screw connection or a hook and loop tape connection is alternatively provided. The hook construction has two hook-in openings 16, 16' of the base element 3 and two respective hook-in elements 17, 17' of U-shaped element 4.

The underside of each of the frame 2, the base element 3, and both auxiliary elements 6, 6' are provided with hook and loop tape 11 for coupling to the inner side of a lower element 24 of a sleeve 21. This coupling can be seen clearly in FIG. 5. The respective outer side 23, being the underside of the sleeve 21, is provided with material for a stable coupling to the seating surface of the seat. In this case a slip-resistant rubber is provided for this purpose.

Figure 6:
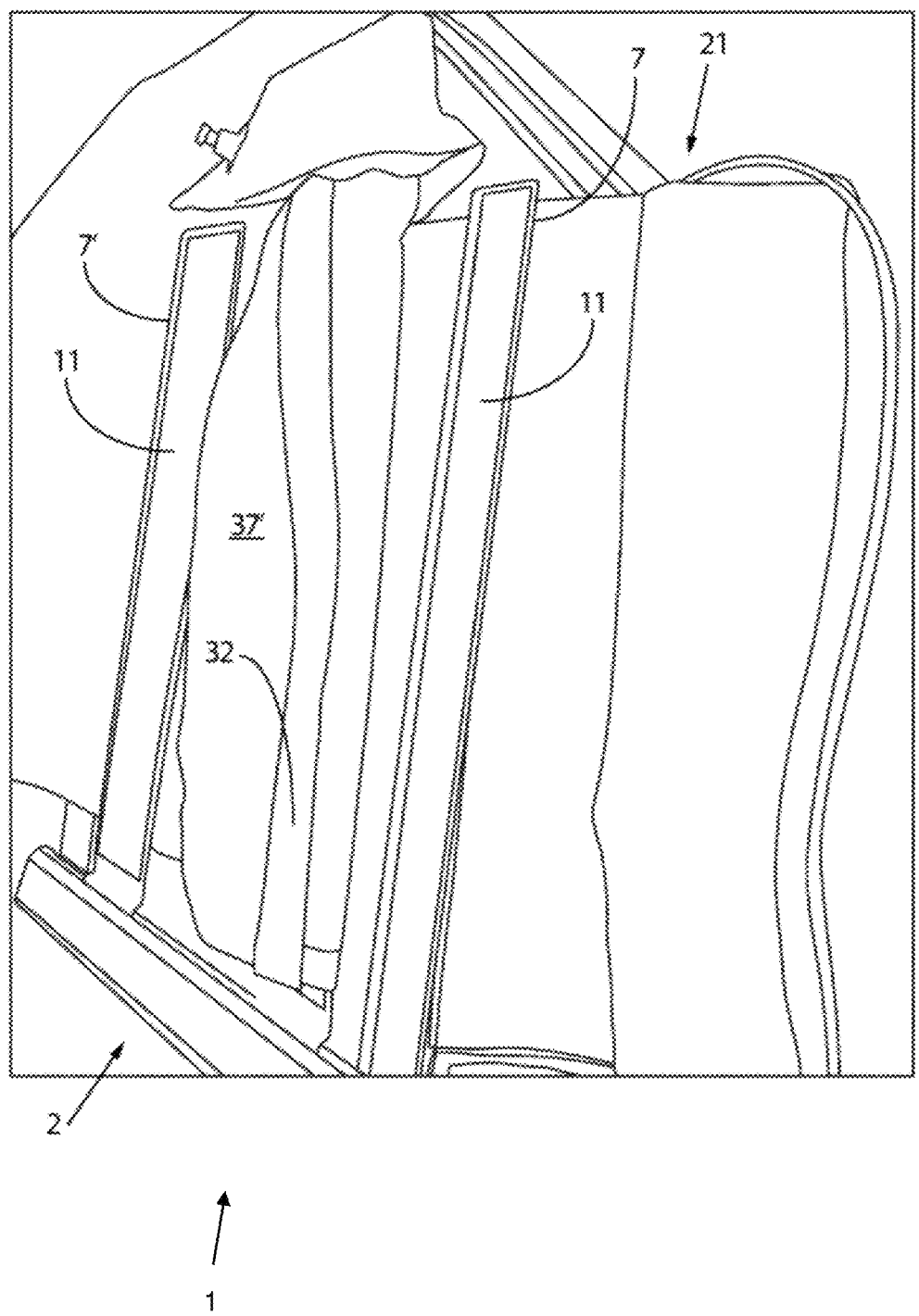
Figure 7:
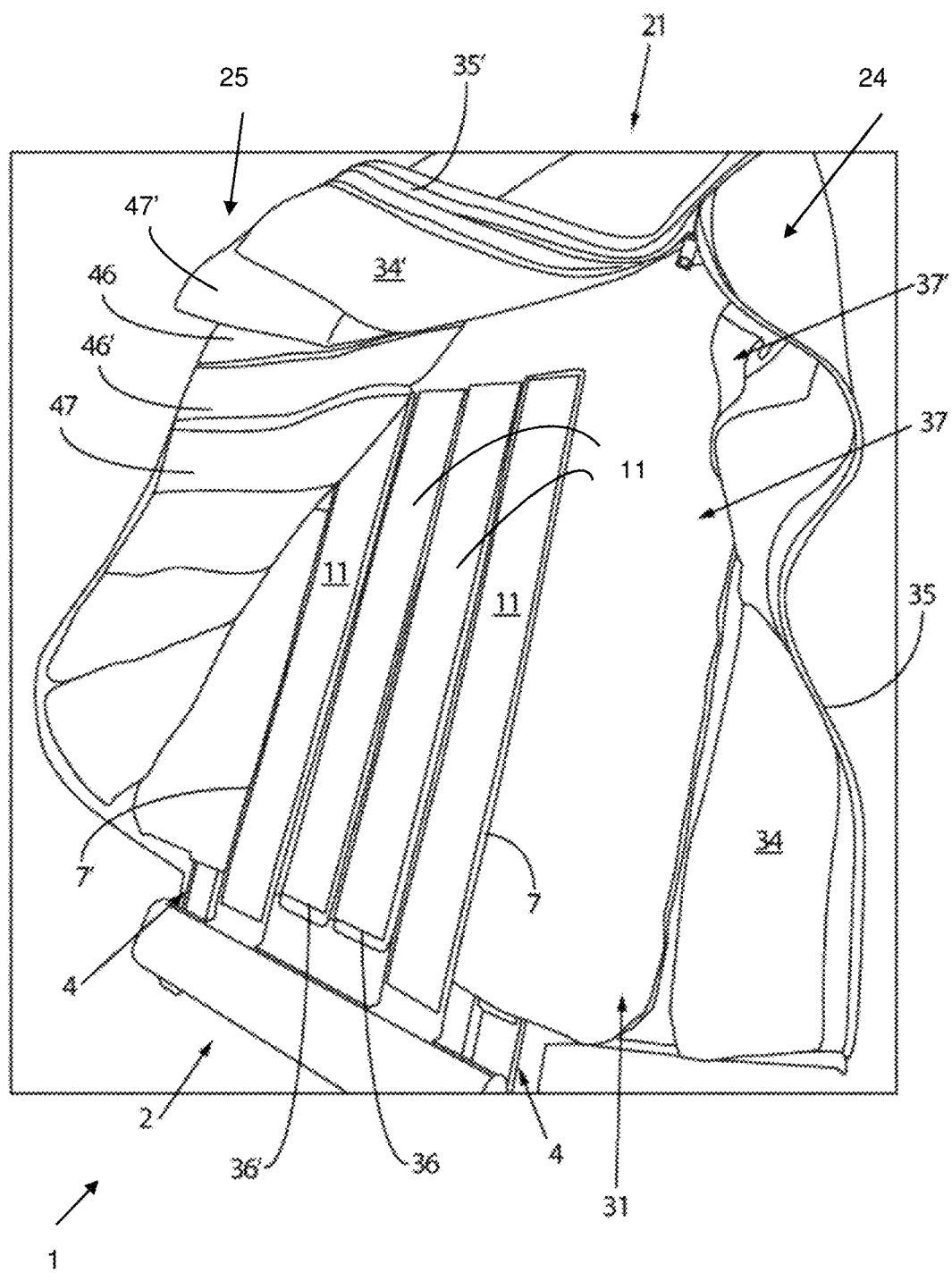

Shown in FIGS. 6 and 7 is the operation of the interior of the device in combination with the sleeve 21. A slide assembly 31 lies over auxiliary elements 6, 6'. This slide assembly 31 is secured with a layer of sheeting (e.g., a sheet of fabric) 37' to the upper side of auxiliary elements 6, 6' by means of a hook and loop tape 32 on layer of sheeting 37' and the respective hook and loop tape 11 on the upper side of auxiliary elements 6, 6'. Between auxiliary elements 6, 6', slide assembly 31 runs below the shear force receiving means 7, 7' and filler elements 36, 36'. Because of slide assembly 31 comprising two sheets or layers of sheeting 37, 37' arranged one on the other and slidable substantially without friction relative to each other, these shear force receiving means 7, 7' and the filler elements 6, 6' can move freely in the direction of arrows A (shown in FIG. 3) relative to lower element 24 of the sleeve 21.

For the purpose of providing a connection between the upper side of shear force receiving means 7, 7' and filler elements 36, 36', strips of hook and loop tape 47, 47', 46, 46' are provided on the inner side of an upper element 25 of the sleeve 21 to connect to respective strips of hook and loop tape 11 provided on the shear force receiving means 7, 7' and the filler elements 6, 6'.

For the purpose of providing a limitation of lateral friction of a seat cushion arranged on the sleeve 21, the sleeve 21 is provided on the sides with wall elements 34, 34' which are secured to each other by means of a zip fastening 35, 35'. This forms an intermediate layer which eliminates as far as possible all friction.

The device is therefore used in a method for measuring the shear forces, wherein use is made of the measured data.

The sheeting of slide assembly 31, as designated in the foregoing as two or more layers of sheeting 37, 37', is effective in minimizing friction between the frame 2, with auxiliary elements 6, 6' fixed on the underside of the sleeve 21 and thereby substantially fixed to the seat part of the chair, and shear force receiving means 7, 7' (e.g., force receiving lamellas) substantially fixed to the upper side of the sleeve 21. The sheeting arranged against the underside of the sleeve 21 therefore has to be movable with minimal friction relative to the sheeting arranged against the upper side of the sleeve 21. Applied for this purpose are the stated friction-reducing means, such as by means of the treated sheeting and/or by means of the lubricants between the sheeting layers. Applied in the context of this document is the existing definition of sheeting: sheeting (folie) is a thin, sometimes extremely thin sheet. Sheeting (folie) is a collective term for fabric that can be used for many applications. The definition from 'Techniek in Nederland' (Technology in the Netherlands) is: sheeting (folie)—very thin material. Referred to therefore within the context of this document are at least sheets, layers, sheets of plastic, sheets of woven plastic, such as woven nylon, sheets of textile (fabric), layers of plastics, and coated and non-coated variants thereof.

The present invention has been described in the foregoing on the basis of several preferred embodiments. Different aspects of different embodiments are deemed described in combination with each other, wherein all combinations which can be deemed by a skilled person in the field as falling within the scope of the invention on the basis of reading of this document are included. These preferred embodiments are not limitative for the scope of protection of this document. The rights sought are defined in the appended claims.

The invention claimed is:

1. A shear force measuring device for measuring a shear force of a human body relative to a seat, the shear force measuring device comprising:
   a frame for providing a mechanical, substantially slide-free connection to the seat, wherein the frame comprises:
      a base element; and
      a U-shaped element connected to the base element, wherein the U-shaped element comprises:
         a connecting element;
         a first auxiliary element connected to the connecting element; and
         a second auxiliary element connected to the connecting element;
      wherein the connecting element of the U-shaped member is attached to the base element;
   a force sensor arranged in the base element of the frame; and
   shear force receiving means coupled to the base element of the frame and positioned between the first auxiliary element and the second auxiliary element, wherein the shear force receiving means is configured to receive the shear force, and wherein the shear force receiving means is coupled to the force sensor, wherein the shear force receiving means are arranged and configured such that shear force exerted on the shear force receiving means is transferable to the force sensor so that the shear force is detectable by the force sensor:
   wherein the shear force receiving means comprises:
      a plurality of force receiving elements that are substantially lamellar and are coupled to the base element via the force sensor.

2. The shear force measuring device as claimed in claim 1, comprising a slide assembly enhancing substantially frictionless or low-friction slidability of the shear force receiving means relative to the force sensor and/or the seat, wherein the slide assembly comprises coupling means for coupling to the frame.

3. The shear force measuring device as claimed in claim 2, wherein the slide assembly is configured to impart slidability to the shear force receiving means over an operating distance of the force sensor.

4. The shear force measuring device as claimed in claim 2, wherein the slide assembly comprises at least two layers of sheeting with lubricants and/or a quantity of air arranged therebetween.

5. The shear force measuring device as claimed in claim 4, wherein the sheeting or at least a layer thereof is treated with a friction-reducing additive.

6. The shear force measuring device as claimed in claim 4, wherein the shear force receiving means and/or the slide assembly and/or the sheeting comprise nylon, polyester, polypropylene, or polyethylene.

7. The shear force measuring device as claimed in claim 4, wherein the lubricants comprise an oil, a grease, a graphite-containing emulsion, or a gel.

8. The shear force measuring device as claimed in claim 2, wherein the slide assembly comprises a layer formed from a deformable material, wherein the deformable material comprises an elastic material or a gelatinous material.

9. The shear force measuring device as claimed in claim 1, further comprising:
   a control unit arranged in the base element of the frame; and
   an energy source arranged in the base element of the frame that provides power to the force sensor;
   wherein an operating distance of the force sensor is such that substantially no movement of the shear force receiving means is required for the force sensor to measure the shear force of the human body relative to the seat.

10. The shear force measuring device as claimed in claim 9, wherein the force sensor is a first force sensor, and further comprising:
   a second force sensor arranged in the base element of the frame;
   wherein the first force sensor and the second force sensor are each load cells which are mounted on a support bracket in the base element.

11. The shear force measuring device as claimed in claim 1, wherein an operating distance of the force sensor lies in the range of 1 micron to 1 centimetre.

12. The shear force measuring device as claimed in claim 1, wherein the base element of the frame extends over a width of between a third of and a whole of the width of the seating surface forming a seat.

13. The shear force measuring device as claimed in claim 1, wherein the first auxiliary element and the second auxiliary element extend away from the base element.

14. The shear force measuring device as claimed in claim 1, comprising a sleeve sized and configured to envelope at least a part of the shear force receiving means during use.

15. The shear force measuring device as claimed in claim 14, wherein the sleeve is provided with lateral upright side parts for providing for gliding of a seat cushion.

16. The shear force measuring device as claimed in claim 14, wherein the sleeve is provided with connecting means configured to couple to an upper side of the shear force receiving means to the sleeve to transfer the shear force to the shear force receiving means.

17. The shear force measuring device as claimed in claim 1, comprising filler elements configured to fill a space between the shear force receiving means.

18. The shear force measuring device as claimed in claim 1, wherein the base element of the frame comprises at least one transverse elongate element which is arrangeable on a rear side of the seating surface of the seat and wherein the shear force receiving means is arranged extending in a forward direction from the at least one transverse elongate element.

19. The shear force measuring device as claimed in claim 1, comprising a control module coupled to the sensor for receiving measurements from the sensor, wherein the control module comprises a memory for storing the measurements therein for the purpose of analysing the measurements.

20. The shear force measuring device as claimed in claim 19, comprising an output module for outputting the measurements to a computer device.

21. The shear force measuring device as claimed in claim 1, wherein the sensor comprises a piezo-element.

22. The shear force measuring device as claimed in claim 1, wherein the shear force measuring device functions in combination with diverse seats with diverse seating surfaces.

23. A wheelchair or seat comprising a shear force measuring device as claimed in claim 1.

24. A method for performing a shear force measurement by making use of a shear force measuring device as claimed in claim 1, the method comprising:
  recording a series of measurements by means of the force sensor at a predetermined time interval,
  storing the series of measurements in a memory, and
  outputting the series of measurements to a computer device in the case of an active communication connection to the computer device.

25. A computer-readable carrier comprising computer program means configured to perform a method for performing a shear force measurement when the computer program means are loaded into a control module of a shear force measuring device according to claim 1.

26. A computer-readable carrier comprising computer program means configured to receive, when executed on a processing unit of a computer device, measurements from a shear force measuring device according to claim 1.

* * * * *